Feb. 8, 1966 P. GRAFTON 3,233,842

REEL FOR TAPE

Filed Sept. 5, 1963

INVENTOR.
PERCY GRAFTON

BY James and Franklin

ATTORNEYS 3,233,842

REEL FOR TAPE

Percy Grafton, Boonton, N.J., assignor to Boonton Molding Company, Inc., Boonton, N.J., a corporation of New Jersey Filed Sept. 5, 1963, Ser. No. 306,748
1 Claim. (Cl. 242—74.2)

This invention relates to spools or reels, and more particularly to reels for magnetic recording tape.

The usual reel has a cylindrical hub with circular side walls secured thereto. The hub is slotted to receive the inner end of the tape, and the side walls are cut away to form windows near the slot to facilitate insertion of the end of the tape in the slot. Such reels have not proven altogether satisfactory for use in costly computers and high priced instrumentation in which even a minute imperfection in the tape may cause an error. The compressive force of winding the tape causes inward flexing of the tape at the slot. The edges of the windows in the side walls may strike the tape edge and damage it slightly. When turned at high speed, the windows cause air turbulence which affects the uniformity of the winding. Subsequently, when the tape is used at high speed in sensitive apparatus, these minor imperfections may lead to an erroneous response.

The general object of the present invention is to improve reels for magnetic recording tape, and to overcome the foregoing difficulties. In accordance with my invention, the hub is provided with a wide slot for easy insertion of the tape end without the aid of windows, and is further provided with a resilient clamp which tends to close the wide slot and to somewhat grip the tape end. In accordance with a further feature and object of the invention, the outer surface of the clamp conforms substantially to the cylindrical surface of the hub, thereby supporting the tape effectively against the winding pressure.

A further object of the invention is to eliminate the need for the usual complete casing or box in which the reel and tape are stored. With this object in view, the circular sides of the reel are left intact or windowless, and the reel is provided with an annular cover which fits around the periphery of the reel, thereby forming with the reel a housing which protectively encloses the tape.

To accomplish the foregoing objects, and other more specific objects which will hereinafter appear, my invention resides in the tape reel elements and their relation one to another, as are hereinafter more particularly described in the following specification. The specification is accompanied by a drawing in which.

Figures 1, 2, 3:
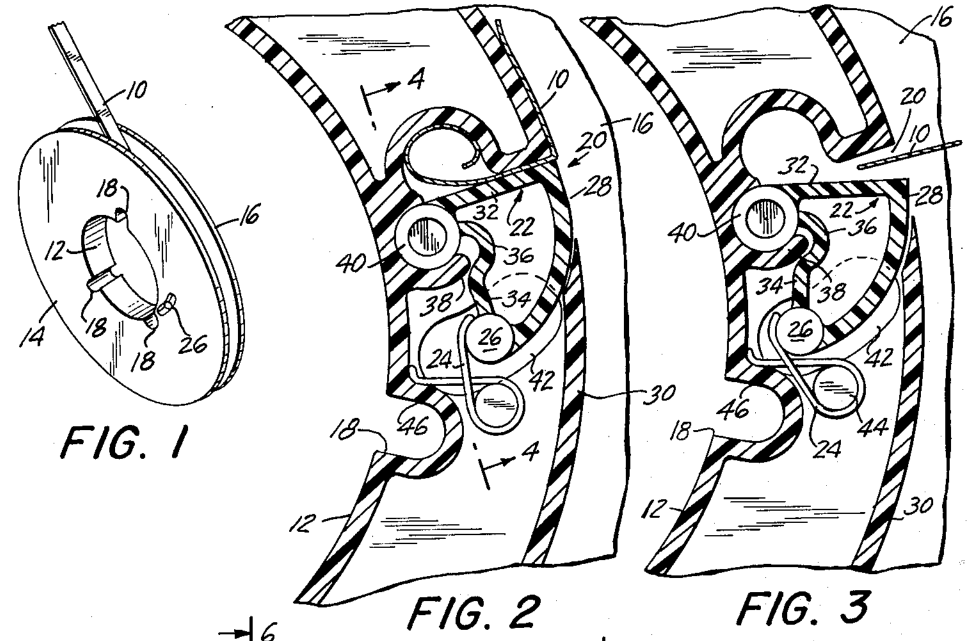
FIG. 1 is a perspective view showing a tape reel embodying features of my invention.
FIG. 2 is a fragmentary enlarged section taken approximately in the plane of the line 2—2 of FIG. 4.
FIG. 3 is a similar view with the tape clamp in partially retracted position.

Referring to the drawing, and more particularly to FIG. 1, the reel for tape 10 comprises a hub portion 12 and two side walls 14 and 16. The hub portion is cylindrical and the side walls are circular and preferably windowless. The reel is provided with spline grooves or keyways, indicated at 18.

Referring now to FIGS. 2 and 3, the hub portion has a wide tape slot 20 to readily receive the starting end of the tape 10. There is also a tape clamp 22 pivoted at the slot, and resilient means 24 urging the clamp in slot-closing direction. Finger tabs 26 are accessible at the sides of the reel to retract the clamp, as shown by the change from FIG. 2 to FIG. 3. In preferred form, the outer surface 28 of the clamp substantially conforms to the cylindrical surface 30 of the hub, so as to support the tape at the slot against winding pressure. This makes it possible to use a wide opening at slot 20, which in turn facilitates insertion of the tape end despite the absence of windows in the side walls.

Figure 4:
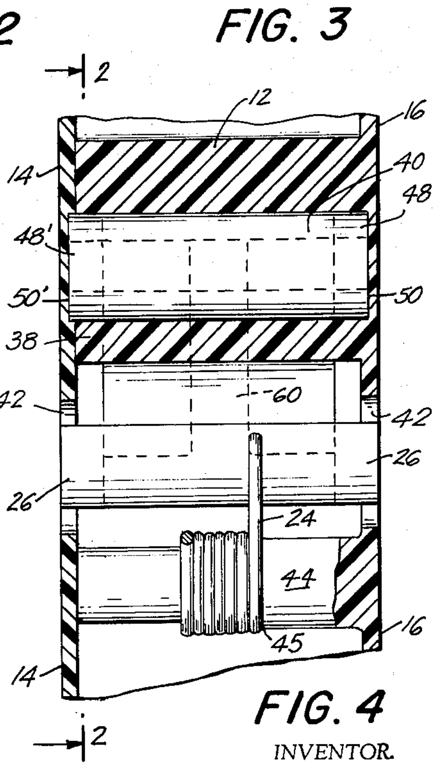
FIG. 4 is a fragmentary transverse section taken approximately in the plane of the line 4—4 of FIG. 2.

Considering the arrangement in greater detail, and referring to FIG. 4, the hub portion 12 is preferably molded integrally with the side wall 16. The other side wall 14 is made separately and is eventually secured to the hub portion, as by the use of a suitable cement or solvent. The hub portion in the present reel is hollow, it comprising the inner wall 12 (FIG. 2) and outer wall 30, the space therebetween serving to accommodate the spline grooves 18, as well as the clamp 22.

The clamp 22 also may be hollow, it comprising an arcuate wall 28 connecting approximate radial walls 32 and 34 to make up a sector of a cylinder. While not essential it may include a middle web of material indicated in broken lines at 60 in FIG. 4. The radial wall 34 is preferably concaved or recessed at 36 to clear the lip 38 of a bearing which is molded integrally in the hub portion of the reel. This receives a shaft or journal portion 40, which in the present case is hollow throughout its length to conserve in the use of the plastics material.

The clamp is preferably made hollow for light weight, in order not to unbalance the reel. If desired the opposite side of the reel may have some material molded between the inner wall 12 and the outer wall 30 to counterbalance the clamp 22.

The tabs 26 project sidewardly into openings 42. These may be made narrower if the tabs project from the reel, but I prefer to terminate the tabs flush with the sides of the reel, and in such case the openings 42 are made somewhat generous in size so that the tabs are readily reached and moved by the fingers of an operator, even though the tabs do not actually project beyond the openings.

The resilient means 24 in the present case is a coiled spring, the ends of which project and act in torsion. The spring is slid over and positioned by a post 44 which is formed integrally with the side 16 of the reel. The other end of the post may terminate short of the other side of the reel, or alternatively it may be received in a mating recess in the side 14. The post may, if desired, be stepped in diameter as shown at 45 in FIG. 4, thereby helping position the spring 24 about midway between the sides of the reel. One end of the spring bears against the clamp between the tabs 26. The other end bears against the reel itself, and in this case it bears against the wall 46 (FIG. 2 or 3) at one of the keyways or spline grooves 18. The spring may be very light, because no significant clamping pressure is needed. It serves to fill or close the wide slot, rather than to tightly grip the tape end.

The clamp between the tabs 26 may be notched or grooved slightly to receive the end of spring 24, thereby holding the spring against axial movement on post 44, and in such case, there is no need to step the diameter of the post at 45.

The bearing wall 38 together with its opposite wall may extend more than halfway around the journal portion 40, thereby acting as a retentive bearing, without the aid of trunnions. Even if less, the end of wall 30 retains the clamp. Either bearing accepts the winding pressure of the tape on the outer surface 28 which fills the wide slot 20 when the clamp is closed.

Referring to FIG. 4, in the present case the journal portion 40 is extended slightly beyond the side of the clamp 22, as shown at 48, where it is received and is slightly recessed in a bearing hole 50 molded in the side wall 16. This also may be done at the opposite side, as shown at 48' and 50'. The holes are preferably blind holes so that the outside faces of the reel are unmarred. A similar blind hole may be provided in wall 14 for the end of post 44.

To assemble the reel, the clamp is slid axially in its bearing; the spring is slid on its post; and the side 14 is then cemented in position. This operation may be aided by appropriate pilot pins and/or ledges (not shown), as is usual in the plastics molding art.

Figure 5:
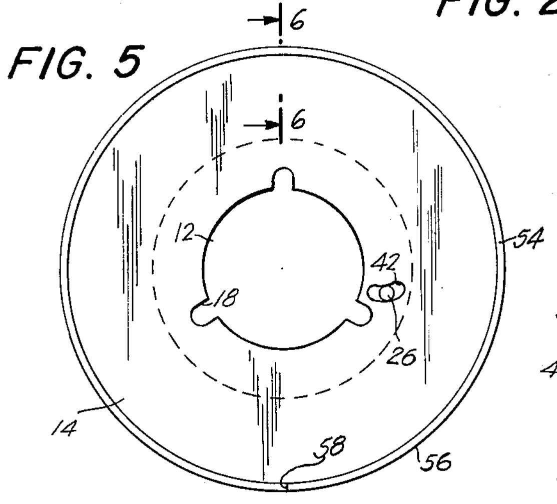
FIG. 5 is an elevation showing the reel with an annular cover applied thereto.
Figure 6:
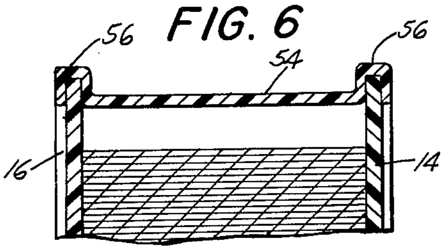
FIG. 6 is a fragmentary transverse section taken approximately in the plane of the line 6—6 of FIG. 5, in larger scale.

Referring now to FIGS. 5 and 6 of the drawing, the reel may be completed to act as a casing by the addition of an annular rim or cover 54. This is preferably channeled near each edge, as shown at 56 in FIG. 6. The cover may be made resilient, with abutting ends shown at 58 in FIG. 5, in which case the cover may be applied by simply springing it in position around the reel. If desired, the ends may be made to overlap for better closure. The casing thus provided is made possible because the sides of the reel are windowless, which in turn is feasible because the slot 20 may be made very wide to readily receive the tape end while manipulating the tape from outside the periphery of the reel, and that in turn is feasible because the slot is closed by the outer surface 28 of the clamp 22.

It is believed that the construction and method of use of my molded tape reel, as well as the advantages thereof, will be apparent from the foregoing detailed description. It will also be apparent that while I have shown and described the invention in a preferred form, changes may be made without departing from the scope of the invention, as sought to be defined in the following claim.

I claim:

A reel for tape, said reel being made of molded plastics material and comprising a hub, two circular side walls secured to said hub, said hub being two concentric cylinders formed integrally with one of said side walls, the outer cylinder of said hub having a wide tape slot to readily receive the starting end of the tape, the inner cylinder having spline grooves, and a tape clamp pivoted between said cylinders at said slot, the side of said slot opposite the clamp having a chamber to receive excess tape end, said clamp being made of molded plastics material and having a trunnion portion received in a mating bearing, said bearing being an open slot molded on the outside of said inner cylinder, said clamp having finger tabs which project sidewardly into access slots through the side walls of the reel between the cylinders, one of said side walls having a post receiving a coiled wire torsion spring one end of which bears against the clamp to urge it in slot-closing direction, the outer surface of said clamp projecting through the outer cylinder and substantially conforming to the cylindrical outer surface of the hub so as to support the tape at the slot against winding pressure.

References Cited by the Examiner

UNITED STATES PATENTS

| | | | |
|---|---|---|---|
| 1,226,407 | 5/1917 | Taylor et al. | 242—74.2 |
| 1,926,588 | 9/1933 | Hayden | 206—52 |
| 2,161,157 | 6/1939 | Goldberg | 206—52 |
| 2,484,100 | 10/1949 | Kramer | 242—74.2 X |
| 2,587,517 | 2/1952 | Paxson | 242—78.3 |
| 2,638,284 | 5/1953 | Rahfuse | 242—74.2 |
| 2,701,177 | 2/1955 | Van Rennes | 242—74.2 X |
| 2,842,262 | 7/1958 | Wismer | 206—47 |
| 2,948,487 | 8/1960 | Locklin | 242—74.2 |
| 3,002,610 | 10/1961 | Granger | 242—71.8 X |
| 3,095,969 | 7/1963 | Morrison | 206—53 |
| 3,096,950 | 7/1963 | Gutterman | 242—74 |

FOREIGN PATENTS

| | | |
|---|---|---|
| 1,181,832 | 1/1959 | France. |
| 714,177 | 8/1954 | Great Britain. |

OTHER REFERENCES

Jakob et al.: German application, 1,144,588, printed February 28, 1963.

MERVIN STEIN, *Primary Examiner.*

STANLEY N. GILREATH, *Examiner.*